United States Patent [19]

Kunimune et al.

[11] Patent Number: 5,473,040

[45] Date of Patent: Dec. 5, 1995

[54] POLYIMIDESILOXANE FILM OF LOW HEAT-CONDUCTIVITY

[75] Inventors: Kouichi Kunimune, Chibaken; Toshiharu Aono, Yokohamashi, both of Japan

[73] Assignee: Chisso Corporation, Osaka, Japan

[21] Appl. No.: 266,582

[22] Filed: Jun. 28, 1994

[30] Foreign Application Priority Data

Jul. 16, 1993 [JP] Japan .................... 5-199072

[51] Int. Cl.$^6$ .................................. C08G 77/26
[52] U.S. Cl. .................. 528/26; 528/28; 528/38; 525/431
[58] Field of Search ................... 528/26, 28, 38; 525/431

[56] References Cited

U.S. PATENT DOCUMENTS

| | | | |
|---|---|---|---|
| 3,948,835 | 4/1976 | Greber et al. | 528/26 |
| 4,818,806 | 4/1989 | Kunimune et al. | 528/26 |
| 5,063,115 | 11/1991 | Merriman, Jr. et al. | 428/447 |
| 5,073,607 | 12/1991 | Katz | 525/431 |
| 5,114,757 | 5/1992 | Linde et al. | 427/387 |

FOREIGN PATENT DOCUMENTS

| | | |
|---|---|---|
| 57-143328 | 9/1982 | Japan . |
| 58-7473 | 1/1983 | Japan . |
| 58-13631 | 1/1983 | Japan . |

*Primary Examiner*—Melvyn I. Marquis
*Assistant Examiner*—Margaret W. Glass
*Attorney, Agent, or Firm*—Lowe, Price, LeBlanc & Becker

[57] ABSTRACT

A polyimidesiloxane film having a low heat conductivity without damaging the heat resistance intrinsic of polyimide, a high hardness and a superior adherence onto its substrate, is provided, which polyimidesiloxane film comprises a cross linked copolymer having repetition units expressed by the formula (1):

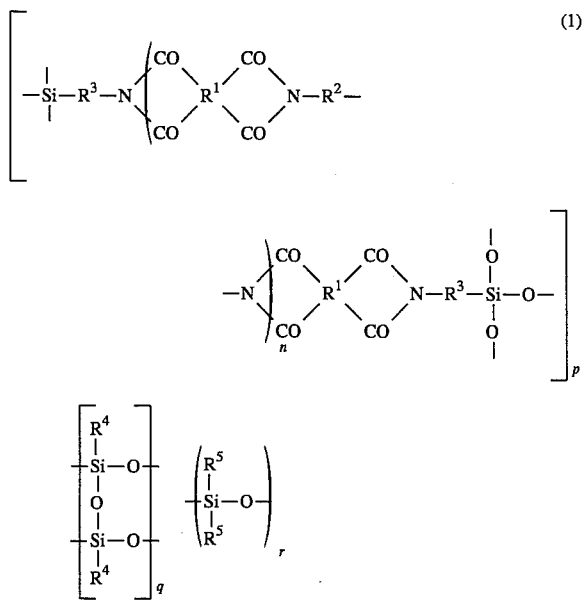

wherein $R^1$ independently is a tetravalent organic group, $R^2$ independently is a divalent organic group of 2 to 30 C, $R^3$ independently is represented by 4 specified formulas, $R^4$ and $R^5$ each are a specified organic group, and n, p, q, and r each have a value within a range satisfying 3 specified equations, and which film exhibited a heat resistance of 511° C. or higher, a hardness of 3H or higher and a heat conductivity of 0.160 or lower.

4 Claims, 1 Drawing Sheet

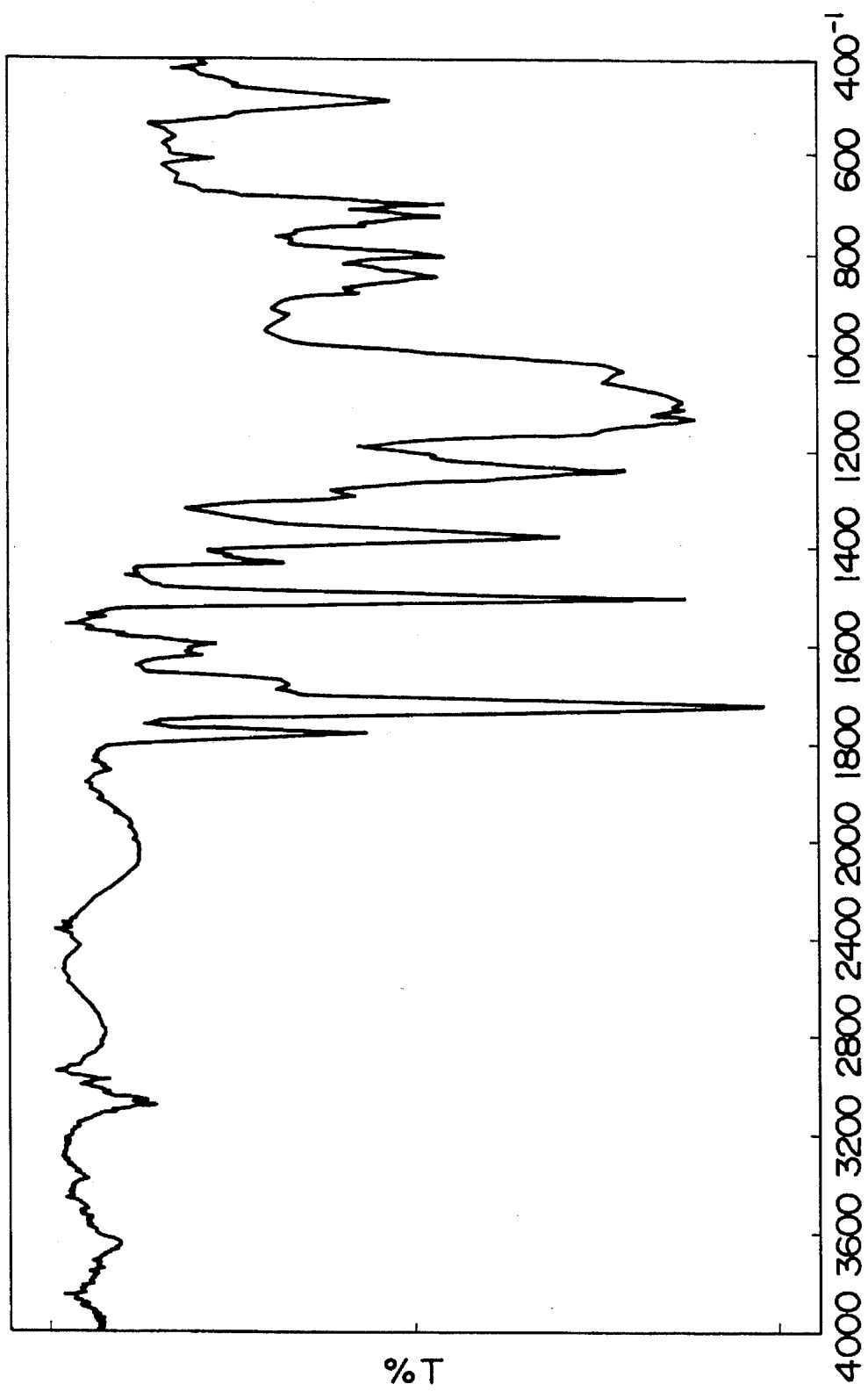

POLYIMIDESILOXANE FILM OF LOW HEAT-CONDUCTIVITY

BACKGROUND OF THE INVENTION

1. Field of the Invention

This invention relates to a polyimidesiloxane film of low heat-conductivity. More particularly, it relates to a polyimidesiloxane film of low heat-conductivity having a high hardness, a high heat-resistance and a superior adherence onto its substrate.

2. Description of the Related Art

Polyimide resins have a superior heat resistance and also superior mechanical characteristics and electric characteristics; hence they have been broadly used as protecting materials, insulating materials or adhesives in the fields of electronic equipments, films and structural materials. However, depending upon use applications, polyimides for enhancing heat insulating properties have often been desired. For such a use application, there have been used polyimides having a part of diamine component as the raw material, replaced by dimethylsiloxane oligomer of the following formula (9) having 3-aminopropyl group at both the ends thereof:

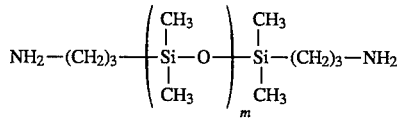

(9)

wherein m represents 1 to 100

(see for example, Japanese patent application laid-open Nos. Sho 57-143328, Sho 58-7473, Sho 58-13631, etc.).

However, these polyimide resins have a low heat-conductivity, but as their surface hardness lowers, the heat resistance lowers down to about 300° C.; hence they have a drawback that their use applications are restricted.

Problem to Be Solved by the Invention

The present inventors have made extensive research and as a result have found that when a polyimidesiloxane having a specified structure is used, a polyimidesiloxane film of low heat-conductivity is obtained without lowering the surface hardness and the heat resistance; and we have completed the present invention.

As apparent from the foregoing, the object of the present invention is to provide a polyimidesiloxane film having overcome the above problem of the prior art, without reducing the surface hardness and the heat resistance.

SUMMARY OF THE INVENTION

The present invention has the following five constitutions:

(1) A polyimidesiloxane film of low heat-conductivity, comprising a crosslinked copolymer having three kinds of repetition units expressed by the formula (1):

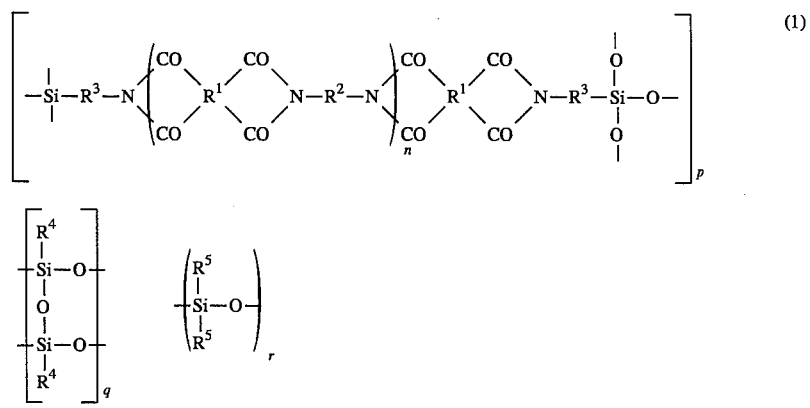

wherein $R^1$ independently represents a tetravalent organic group; $R^2$ independently represents a divalent organic group having 2 to 30 carbon atoms; $R^5$ is independently expressed by the formula (2), (3), (4) or (5)

(2)

(3)

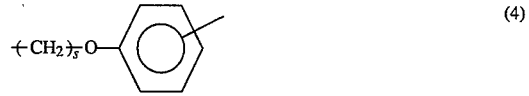

(4)

(5)

wherein s represents an integer of 1 to 4; $R^4$ and $R^5$ each independently represent an organic group having 1 to 7 carbon atoms; n falls within a range of $0 \leq n \leq 50$; and p, q and r each represent a positive integer and fall within the ranges of the equations (6), (7) and (8):

$$0.001 \leq \frac{p}{p+q+r} \leq 0.3 \quad (6)$$

$$0.3 \leq \frac{q}{p+q+r} \leq 0.9 \quad (7)$$

-continued $$0.1 \leq \frac{r}{p+q+r} \leq 0.6. \tag{8}$$

(2) A polyimidesiloxane film according to item (1), wherein $R^1$ and $R^2$ each independently represent an aromatic group having 6 to 30 carbon atoms.

(3) A polyimidesiloxane film according to either one of item (1) or item (2), wherein $R^3$ represents a phenylene group.

(4) A polyimidesiloxane film according to any one of item (1) to item (3), wherein $R^4$ and $R^5$ each independently represent methyl group or a phenyl group.

BRIEF DESCRIPTION OF THE ACCOMPANYING DRAWING

FIG. 1 shows the infrared absorption spectra of a film obtained in Example 1.

DETAILED DESCRIPTION OF PREFERRED EMBODIMENTS

The polyimidesiloxane film of the present invention can be prepared by coating on a substrate, an organic solvent solution of a mixture or a reaction product of a silicon-containing polyamic acid expressed by the formula (10)

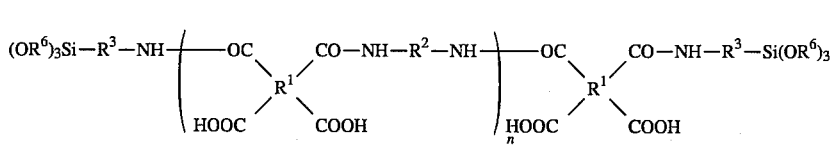

(10)

with a polyorganosiloxane expressed by the formula (11)

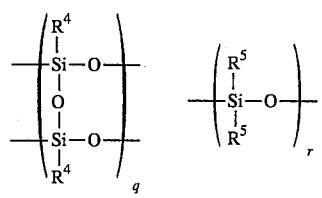

(11)

followed by heating the resulting material at 200° to 500° C.

In the above formulas (10) and (11), $R^6$ represents an alkyl group of 1 to 6 carbon atoms, and $R^1$, $R^2$, $R^3$, $R^4$, $R^5$, n, p, q and r are as defined above.

The silicon-containing polyamic acid used in the present invention is obtained by reacting a tetracarboxylic dianhydride, a diamine and an aminosilane expressed by the formula (12)

$$NH_2-R^3-Si(OR^6)_3 \tag{12}$$

wherein $R^3$ and $R^6$ are as defined above, in a conventional manner.

As the tetracarboxylic dianhydride used for obtaining the above silicon-containing polyamic acid, the following known compounds are exemplified, but it should not be construed to be limited thereto:

Aromatic tetracarboxylic dianhydrides such as pyromellitic dianhydride, 3,3',4,4'-biphenyltetracarboxylic dianhydride, 2,2',3,3'-biphenyltetracarboxylic dianhydride, 2,3,3',4'-biphenyltetracarboxylic dianhydride, 3,3',4,4'-benzophenonetetracarboxylic dianhydride, 2,2',3,3'-benzophenonetetracarboxylic dianhydride, 2,3,3',4'-benzophenonetetracarboxylic dianhydride, bis-(3,4-dicarboxyphenyl)ether dianhydride, bis-(3,4-dicarboxyphenyl)sulfone dianhydride, 1,2,5,6-naphthalenetetracarboxylic dianhydride, 2,3,6,7-naphthalenetetracarboxylic dianhydride, 2,2-bis-(3,4-dicarboxyphenyl)hexafluoropropane dianhydride, etc., alicyclic tetracarboxylic dianhydrides such as cyclobutane-tetracarboxylic dianhydride, methylcyclobutanetetracarboxylic dianhydride, etc., and aliphatic tetracarboxylic dianhydrides such as 1,2,3,4-tetracarboxybutane dianhydride, etc.

Among these aromatic compounds, those having an aromatic group of 6 to 30 carbon atoms as $R^1$ in the formula (I) are particularly preferable.

Concrete examples of the diamine used in the present invention are as follows, but it should not be construed to be limited thereto:

Aromatic diamines such as 4,4'-diaminodiphenyl ether, 3,4'-diaminodiphenyl ether, 4,4'-diaminodiphenylmethane, 4,4'-diaminodiphenyl sulfone, 4,4'-diaminodiphenyl sulfide, 4,4'-di(m-aminophenoxy)diphenyl sulfone, 4,4'-di(p-aminophenoxy)diphenyl sulfone, o-phenylenediamine, m-phenylenediamine, p-phenylenediamine, benzidine, 3,3'-diaminobenzophenone, 4,4'-diaminobenzophenone, 4,4'-diaminodiphenyl-2,2-propane, 1,5-diaminonaphthalene, 1,8-diaminonaphthalene, 4,4'-bis(4-aminophenoxy)biphenyl, 2,2-bis{4-(4-aminophenoxy)phenyl}hexafluoropropane, 1,4-bis(4-aminophenoxy)benzene, 1,3-bis(4-aminophenoxy)benzene, 4,4'-diamino-3,3'-diethyl-5,5'-dimethyldiphenylmethane, 4,4'-diamino-3,3',5,5'-tetramethyldiphenylmethane, 1,4-diaminotoluene, m-xylylenediamine, 2,2'-dimethylbenzidine, etc., aliphatic diamines such as trimethylenediamine, tetramethylenediamine, hexamethylenediamine, 2,11-dodecanediamine, etc., silicic diamines such as bis(p-aminophenoxy)dimethylsilane, 1,4-bis(3-aminopropyldimethylsilyl)benzene, etc., alicyclic diamines such as 1,4-diaminocyclohexane, bis(4-aminocyclohexyl)methane, isophoronediamine, etc., and guanamines such as acetoguanamine, benzoguanamine, etc. Known diamines other than the above are also usable.

Among these diamines, those having an aromatic group of 6 to 30 carbon atoms, as $R^3$ in the formula (I), are particularly preferable.

As concrete examples of the aminosilane used in the present invention, the following known compounds are exemplified, but it should not be construed to be limited thereto:

aminomethyl-di-n-propoxy-methylsilane, (β-aminoethyl)-di-n-propoxy-methylsilane, (β-aminoethyl)-diethoxyphenylsilane, (β-aminoethyl)-tri-n-propoxysilane, (β-aminoethyl)-dimethoxy-methylsilane, (γ-aminopropyl)-dipropoxymethylsilane, (γ-aminopropyl)-di-n-butoxymethylsilane, (γ-aminopropyl)-triethoxysilane, (γ-aminopropyl)-di-n-pentoxy-phenylsilane, (γ-aminopropyl)-dimethoxy-n-propoxysilane, (δ-aminobutyl)-dimethoxymethylsilane, (3-aminophenyl)-tri-n-propoxysilane, (4-aminophenyl)-tri-n-propoxy-{β-(4-aminophenyl)ethyl}-diethoxy-methylsilane, {β-(3-aminophenyl)ethyl} -di-n-propoxy-phenylsilane, {γ-(4-aminophenyl)propyl} -di-n-propoxy-methylsilane, {γ-(4-aminophenoxy)propyl} -di-n-propoxy-methylsilane, {γ-(3-aminophenoxy)propyl} -di-n-butoxy-methylsilane, {γ-(3-aminophenoxy)-dimethyl-methoxysilane, (γ-aminopropyl)-methyl-diethoxysilane, (γ-aminopropyl)ethyl-di-n-propoxysilane, (4-aminophenyl)-trimethoxysilane, (3-aminophenyl)-trimethoxysilane, (4-aminophenyl)-methyl-dimethoxy-silane, (3-aminophenyl)-dimethylmethoxysilane, (4-aminophenyl)-triethoxysilane, {3-(triethoxysilyl)propyl}urea, etc.

Among these aminosilanes, aminophenylalkoxysilanes are particularly preferable.

Concrete examples of solvents preferred in the preparation of the silicon-containing polyamic acid in the present invention are as follows:

N-methyl-2-pyrrolidone, N,N-dimethylacetamide, N,N-dimethylformamide, dimethyl sulfoxide, tetramethylurea, pyridine, hexamethylphosphoramide, methylformamide, N-acetyl-2-pyrrolidone, 2-methoxyethanol, 2-ethoxyethanol, 2-butoxyethanol, diethylene glycol monomethyl ether, diethylene glycol monoethyl ether, diethylene glycol monobutyl ether, cyclopentanone, methylcyclopentanone, cyclohexanone, cresol, γ-butyrolactone, isophorone, N,N-diethylacetamide, N,N-diethylformamide, N,N-dimethylmethoxyacetamide, tetrahydrofuran, N-methyl-ε-caprolactam, tetrahydrothiophene dioxide (sulpholane), etc.

The silicon-containing polyamic acid used in the present invention can be obtained by mixing A mol of a tetracarboxylic dianhydride, B mol of a diamine and C mol of an aminosilane at a temperautre close to room one and within ranges satisfying the following equations (13) and (14):

$$1.8 \leq \frac{C}{A-B} \leq 2.2 \tag{13}$$

$$0.04 \leq \frac{C}{B+C} \leq 2 \tag{14}$$

in the above organic solvent.

Next, a process for producing the polyorganosiloxane expressed by the following formula (11) will be described:

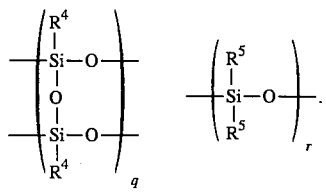
(11)

The polyorganosiloxane can be easily obtained by hydrolyzing hydrolyzable groups expressed by the formulas (15) and (16)

 SiX$_3$ (15)

$_2$SiX$_2$ (16)

in the presence of an acid catalyst and in an organic solvent according to a conventional process. In the above formulas, X represents chlorine atom or OR$^6$ and R$^4$, R$^5$ and R$^6$ are as defined above. Among these, R$^4$ and R$^5$ are particularly preferred to be methyl group or phenyl group.

In the hydrolyzation, it is possible to firstly carry out the hydrolyzation reaction of a trifunctional silane expressed by the formula (15), followed by carrying out the hydrolyzation reaction of a bifunctional silane expressed by the formula (16) (of course, these reactions can be also carried out in an adverse order). According to such a process, the so-called block copolymer is obtained. Alternatively, it is also possible to simultaneously mix the both and carry out the hydrolyzation reaction. In such a case, the so-called random copolymer is obtained.

When the solvent, moisture, etc. contained in the reaction solution is vaporized and dried, a polyorganosiloxane having a low molecular weight is obtained and it can be used for the subsequent reaction, as it is. Further, if necessary, when the polymer is dissolved in an organic solvent such as methyl isobutyl ketone, xylene or the like, followed by adding an alkaline compound such as potassium hydroxide, ammonia or the like or a dehydrating agent such as dicyclohexylcarbodiimide or the like and carrying out heating reaction, then it is possible to obtain a polymer having a higher molecular weight, and such a polymer is also usable for the succeeding reaction.

The thus obtained silicon-containing polyamic acid and polyorganosiloxane are mixed so as to satisfy the above equations (6), (7) and (8)

$$0.001 \leq \frac{p}{p+q+r} \leq 0.3 \tag{6}$$

$$0.3 \leq \frac{q}{p+q+r} \leq 0.9 \tag{7}$$

$$0.1 \leq \frac{r}{p+q+r} \leq 0.6 \tag{8}$$

and a solution obtained by dissolving the mixture in a solvent for the above silicon-containing polyamic acid or another solvent can be used as a coating solution, as it is. Further, if necessary, when this solution is heated at 30° to 150° C. for several hours to react the above two polymers with each other at their terminal ends, then it is possible to obtain a coating solution containing a polymer having a higher molecular weight.

The coating solution is coated onto a substrate such as silicon wafer, metal plate, plastic plate, glass plate or the like according to known process such as spin-coating, immersion, printing, dispersing, roll coater, or the like, followed by heating the resulting material at 200° to 500° C., preferably 300° to 400° C. for several minutes to several tens hours, preferably for 0.5 to 3 hours, by a known heating means such as electric furnace, hot plate, infrared rays heater or the like, to thereby obtain a polyimidesiloxane film having a low heat-conductivity of the present invention, expressed by the formula (1):

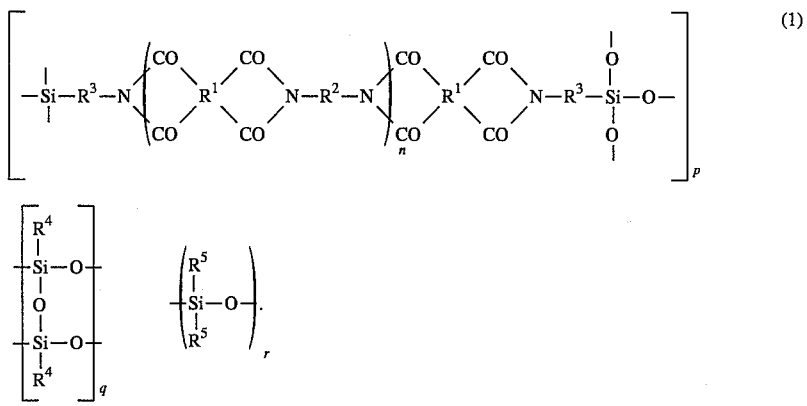

Due to the repetition units of the polyimide part of the first item in the formula (1), the mechanical strength and heat resistance of the resulting film are retained; at the same time, due to the repetition units of the siloxane part of the second item therein, the hardness of the film is improved; and due to the repetition units of the siloxane part of the third item therein, the heat conductivity is lowered. Further, due to the presence of the imide group and the siloxane groups, a superior adherence onto many kinds of substrates is exhibited. Further, if the repetition units of the siloxane part of the third item therein are connected in a chain form, there is a fear of reduction in the heat resistance; hence it is preferred that the repetition units be incorporated into the polymer structure, so that the units can be dispersed thereinto in preferably one or two units. When the proportions of these repetition units are retained within the above ranges, it is possible to obtain the polyimidesiloxane film of the present invention having the above-described characteristics.

The thus obtained polyimidesiloxane film of the present invention has a high hardness, a high heat-resistance, a superior adherence onto substrates and a low heat-conductivity; hence as the field of its use applications, parts for electronic equipments, communication equipments, heavy current equipments, transportation equipments, etc. may be considered. More particularly, various protective coats for semiconductors, flattening coating, buffer coating material, insulating coating, liquid crystal aligning membrane, substrate for color filter, its protective coating, parts for thermal head, reinforcing agent, etc. may be considered. Further, since the polyimidesiloxane film has a low heat-conductivity, a use application for thermal insulation materials may be also considered.

The present invention will be described in more detail by way of Examples and Comparative examples, but it should not be construed to be limited thereto.

Preparations of the silicon-containing polyamic acid and the coating solution consisting of the polyorganosiloxane were carried out as follows:

Preparation example 1

Phenyltriethoxysilane (29.9 g, 0.125 mol), ethanol (100 g), water (27 g) and acetic acid (1 g) were mixed together, followed by reacting the mixture with stirring at 10° C. for 20 hours, further dropwise adding dimethyldiethoxysilane (18.4 g, 0.125 mol) for 2 hours, further reacting the mixture for 10 hours, transferring the resulting solution into an evaporator, drying it under reduced pressure at 40° C. for 2 hours to obtain a polyorganosiloxane, adding N-methyl-2-pyrrolidone (200 g), dissolving it, adding to the solution, 3,3',4,4'-benzophenonetetracarboxylic dianhydride (15.95 g, 0.0495 mol), 4,4'-diaminodiphenyl (8.67 g, 0.0434 mol) and 4-aminophenyltrimethoxysilane (hereinafter abbreviated to APMS) (2.37 g, 0.0111 mol) and reacting them with stirring at 20° C. for 5 hours, to prepare a silicon-containing polyamic acid.

Preparation example 2

Methyltrimethoxysilane (6.80 g, 0.0500 mol), ethanol (100 g), water (12 g) and acetic acid (0.5 g) were mixed together, followed by reacting the mixture with stirring at 20° C. for 3 hours, further dropwise adding dimethyldimethoxysilane (3.00 g, 0.0250 mol) for 2 hours, further reacting the mixture for 3 hours, transferring the resulting solution into an evaporator and drying it under reduced pressure at 40° C. for 2 hours, to obtain a polyorganosiloxane.

Next, N,N-dimethylacetamide (100 g) was added to the siloxane, followed by dissolving it, adding to the solution, pyromellitic dianhydride (8.41 g, 0.0386 mol), 4,4'-bis(4-aminophenoxyphenyl)sulfone (11.11 g, 0.0257 mol) and APMS (5.48 g, 0.0257 mol), and reacting them with stirring at 20° C. for 5 hours, to prepare a silicon-containing polyamic acid.

Preparation example 3

Phenyltrimethoxysilane (59.4 g, 0.300 mol), ethanol (200 g), water (15 g) and acetic acid (1.0 g) were mixed together, followed by reacting the mixture with stirring at 35° C. for 5 hours, further dropwise adding dimethyldimethoxysilane (7.20 g, 0.060 mol) for 3 hours, further reacting the mixture for 3 hours, transferring the resulting solution into an evaporator, drying it under reduced pressure at 40° C. for 2 hours, to obtain a polyorganosiloxane, adding NMP (100 g) and dissolving it.

To the resulting solution were added 3,3',4,4'-biphenyltetracarboxylic dianhydride (16.41 g, 0.0558 mol), p-phenylenediamine (5.02 g, 0.0465 mol) and APMS (3.57 g, 0.0168 mol), followed by reacting the mixture with stirring at 20° C. for 5 hours, to obtain a silicon-containing polyamic acid.

Preparation example 4

Water (300 g), xylene (300 g) and triethylamine (40 g) were mixed together, followed by keeping the temperature of the mixture at 0° C. with stirring, dropwise adding to the resulting solution, methyltrichlorosilane (32.8 g, 0.220 mol) for 2 hours, further reacting the mixture for 2 hours, dropwise adding dimethyldichlorosilane (23.2 g, 0.180 mol) for 2 hours, further reacting the mixture for 5 hours, transferring the reaction mixture into a separating funnel, filtering off the aqueous layer, further adding water (300 g), washing the reaction solution, repeating the procedure till the aqueous layer became neutral, transferring the solution into an evaporator, drying it under reduced pressure at 40° C. for 2 hours, to obtain a polyorganosiloxane, adding NMP (60 g) and anisole (40 g) and dissolving them.

To the resulting solution were added hexafluoroisopropylidene-2,2-bis(phthalic anhydride) (6.96 g, 0.0157 mol), 2,2-bis{4-(4-(aminophenox)phenyl}hexafluoropropane (7.58 g, 0.0146 mol) and 3-aminopropyltriethoxysilane (0.462 g, 0.00209 mol), followed by reacting the mixture with stirring at 20° C. for 5 hours to prepare a silicon-containing polyamic acid.

Comparative preparation example 1

In Preparation example 1, without preparing polyorganosiloxane part, the same raw materials were used in the same quantity of NMP, to prepare a silicon-containing polyamic acid.

Comparative preparation example 2

3,3'-Benzophenonetetracarboxylic dianhydride (12.53 g, 0.039 mol), 3,3'-diaminodiphenyl sulfone (6.20 g, 0.0250 mol) and a diaminosiloxane expressed by the formula (9) ($m$=8.60) were mixed in diethyleneglycol dimethyl ether, followed by reacting the mixture at 30° C. for 10 hours, to prepare a polyamic acid.

In addition, with regard to Preparation examples 1 to 4 and Comparative preparation examples 1 and 2, the values of p/(p+q+r), q/(p+q+r) and r/(p+q+r) in the formulas (6), (7) and (8) are shown in Table 1.

TABLE 1

| Preparation examples or Comparative preparation examples | p/(p + q + r) | q/(p + q + r) | r/(p + q + r) |
| --- | --- | --- | --- |
| Preparation example | | | |
| 1 | 0.024 | 0.49 | 0.49 |
| 2 | 0.15 | 0.57 | 0.28 |
| 3 | 0.025 | 0.81 | 0.16 |
| 4 | 0.0026 | 0.55 | 0.45 |
| Comparative preparation example | | | |
| 1 | 1 | 0 | 0 |
| 2 | — | — | — |

Examples 1 to 4 and Comparative examples 1 and 2

The polymer solutions prepared in Preparation exmaples 1 to 4 and Comparative preparation examples 1 and 2, were each coated onto a substrate, followed by baking at 100° C. for one hour, at 200° C. for 30 minutes and at 400° C. for one hour (but, in Comparative exmaple 2, since the heat resistance was insufficient, the final baking was carried out at 350° C. for one hour), to prepare films.

With regard to these films, the heat resistance, hardness, heat conductivity and adherence thereof were evaluated. The results are shown in Table 2. Further, the infrared absorption spectra of the film obtained in Example 1 are shown in FIG. 1 (measured according to FT/IR-7000 manufactured by Nippon Bunko Co., Ltd.).

TABLE 2

| Examples or Comparative examples | Coating solution | Heat resistance (°C.) | Hardness | Heat conductivity (W/m · k) | Adherence |
| --- | --- | --- | --- | --- | --- |
| Example | Preparation ex. | | | | |
| -1 | -1 | 525 | 5 H | 0.152 | O |
| -2 | -2 | 518 | 4 H | 0.160 | O |
| -3 | -3 | 537 | 6 H | 0.146 | O |
| -4 | -4 | 511 | 3 H | 0.138 | O |
| Compar. ex. | Compar. preparation ex. | | | | |
| -1 | -1 | 532 | 3 H | 0.386 | O |
| -2 | -2 | 380 | B | 0.173 | X |

Heat resistance:

This was measured by means of a thermal analysis device manufactured by Seiko Denshi Kogyo Co., Ltd. (trade name: TG/DTA 220), at a temperature-raising speed of 10° C./min., and expressed by a temperature at which the weight decreased by 3%.

Hardness (Pencil hardness):

This was measured with a film of 1.5 μm thick applied onto a glass plate, according to JISK-5400.

Heat conductivity:

This was measured by means of a laser flash method using TC-7000 manufactured by Shinku Riko Co., Ltd. Adherence:

A film of 1.5 μm thick applied onto a ceramic substrate was notched to prepare 100 small pieces of 1 mm² square, and a cellophane tape was applied onto the surface thereof and soon peeled off. At that time, a case where the cured film peeled off together with the cellophane tape was regarded as x, and a case where the film did not peel off was regarded as o.

Effectiveness of the Invention

The polyimidesiloxane film of the present invention has a superior effectiveness of having no reduction in the heat resistance intrinsic of polyimide, a low heat conductivity, a high hardness, a superior adherence onto substrate, etc.

What we claim is:

1. A polyimidesiloxane film of low heat-conductivity, comprising a crosslinked copolymer having three kinds of repetition units expressed by the formula (1):

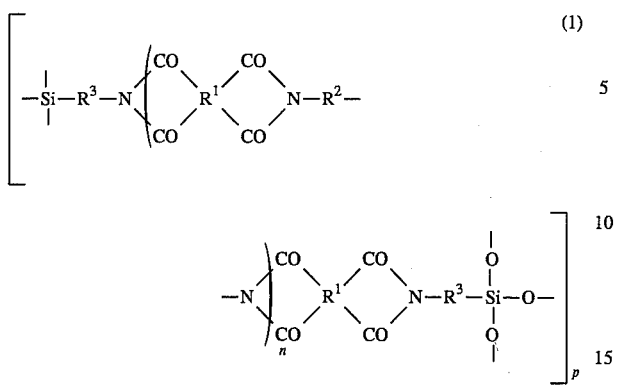
(1)

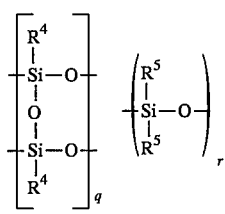

(2)

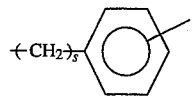
(3)

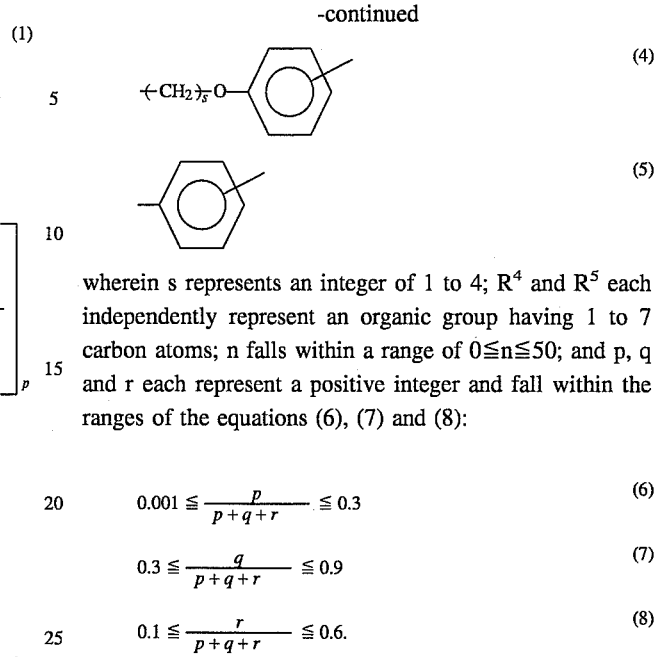

wherein $R^1$ independently represents a tetravalent organic group; $R^2$ independently represents a divalent organic group having 2 to 30 carbon atoms; $R^3$ is independently expressed by the formula (2), (3), (4) or (5)

wherein s represents an integer of 1 to 4; $R^4$ and $R^5$ each independently represent an organic group having 1 to 7 carbon atoms; n falls within a range of $0 \leq n \leq 50$; and p, q and r each represent a positive integer and fall within the ranges of the equations (6), (7) and (8):

$$0.001 \leq \frac{p}{p+q+r} \leq 0.3 \quad (6)$$

$$0.3 \leq \frac{q}{p+q+r} \leq 0.9 \quad (7)$$

$$0.1 \leq \frac{r}{p+q+r} \leq 0.6. \quad (8)$$

2. A polyimidesiloxane film according to claim 1, wherein $R^1$ and $R^2$ each independently represent an aromatic group having 6 to 30 carbon atoms.

3. A polyimidesiloxane film according to claim 1, wherein $R^3$ represents a phenylene group.

4. A polyimidesiloxane film according to claim 1, wherein $R_4$ and $R^5$ each independently represent methyl group or a phenyl group.

* * * * *